(12) United States Patent
Sivan et al.

(10) Patent No.: US 8,432,926 B1
(45) Date of Patent: Apr. 30, 2013

(54) ADJUSTABLE TIME DIVISION MULTIPLEXING (ATDM) ARBITRATION METHODS AND SYSTEMS

(75) Inventors: Ehud Sivan, Zichron Ya'akov (IL); Evgeny Shumsky, Petah Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 188 days.

(21) Appl. No.: 13/035,373

(22) Filed: Feb. 25, 2011

Related U.S. Application Data

(60) Provisional application No. 61/308,741, filed on Feb. 26, 2010.

(51) Int. Cl.
*H04L 12/28* (2006.01)
(52) U.S. Cl.
USPC .......................................................... 370/412
(58) Field of Classification Search .................. None
See application file for complete search history.

(56) References Cited

U.S. PATENT DOCUMENTS

| | | | |
|---|---|---|---|
| 8,108,428 B1* | 1/2012 | Wencel et al. | 707/790 |
| 2006/0026162 A1* | 2/2006 | Salmonsen et al. | 707/10 |
| 2008/0254431 A1* | 10/2008 | Woolf et al. | 434/322 |
| 2009/0076914 A1* | 3/2009 | Coueignoux | 705/14 |

* cited by examiner

*Primary Examiner* — Raj Jain

(57) ABSTRACT

Aspects of the disclosure provide an arbitration system for scheduling access of a plurality of clients to a shared resource. The arbitration system includes a plurality of association circuits corresponding to a plurality of profiles, a plurality of trigger circuits respectively coupled to the plurality of association circuits, and a selection circuitry. Each association circuit is configured to associate clients with the corresponding profile based on client attributes. Each trigger circuit is configured to periodically generate triggers at a rate based on the corresponding profile of the coupled association circuit, and each trigger causes the associated clients of the corresponding profile to be placed on a list of eligible clients. The selection circuitry is configured to select, for a time slice in a Time Division Multiplexing (TDM) frame, a client from the list of eligible clients using an arbitration scheme for accessing the shared resource.

20 Claims, 5 Drawing Sheets

ADJUSTABLE TIME DIVISION MULTIPLEXING (ATDM) ARBITRATION METHODS AND SYSTEMS

INCORPORATION BY REFERENCE

This application claims the benefit of U.S. Provisional Application No. 61/308,741 entitled "Adjustable Time Division (ATDM) Arbiter" filed on Feb. 26, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Arbitration systems are used in a large variety of applications where two or more devices need to access a shared resource. Examples of a shared resource include shared memory, a network switch fabric, a specialized state machine, or a complex computational element.

One form of an arbitration system is known as a "round-robin" arbiter, which works by assigning priority to each "client device" in a repeating sequence or in a sequence based on past access of clients. Unfortunately, while round-robin arbitration schemes are simple in theory, service latency can be a problem as the number of clients grows.

Another form of arbitration system is known as the Time Domain Multiplexing (TDM), or "pizza", arbiter. This type of arbitration scheme works by dividing time into a repeating sequence of time "slices", and assigning clients on a per-slice basis. Unfortunately, TDM arbiters do not work well when the "slices" become too thin, which happens when there are too many clients to service or when the various clients operate at substantially different speeds. For example, assuming that a TDM arbiter is needed to service two clients with one client operating at a data rate of 10M bits and the other client operating at 100 G bits/s, the TDM arbiter may need to resort to frames with 10,001 slices. As TDM arbitration schemes perform poorly with 10,000+ slices (in terms of area/logical cell count/memory bit count), use of a TDM arbitration approach may be unsuitable.

SUMMARY

Various aspects and embodiments of the invention are described in further detail below.

Aspects of the disclosure provide an arbitration system for scheduling access of a plurality of clients to a shared resource. The arbitration system includes a plurality of association circuits corresponding to a plurality of profiles, a plurality of trigger circuits respectively coupled to the plurality of association circuits, and a selection circuitry. Each association circuit is configured to associate clients with the corresponding profile based on client attributes. Each trigger circuit is configured to periodically generate triggers at a rate based on the corresponding profile of the coupled association circuit, and each trigger causes the associated clients of the corresponding profile to be placed on a list of eligible clients. The selection circuitry is configured to select, for a time slice in a Time Division Multiplexing (TDM) frame, a client from the list of eligible clients using an arbitration scheme for accessing the shared resource.

Aspects of the disclosure provide a method for scheduling access of a plurality of clients to a shared resource shared. The method includes associating the plurality of clients with one or more profiles based on client attributes. Further, for each profile, the method includes periodically generating triggers at a rate based on the profile to cause clients associated with the profile to be placed on a list of eligible clients in response to each trigger. Then, the method includes selecting, for a time slice in a Time Division Multiplexing (TDM) frame, one client from the list of eligible clients using arbitration scheme to access the shared resource.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Generally, while TDM arbiters are useful, conventional TDM arbitration schemes perform poorly when used with very large numbers of slices in terms of area/logical cell count/memory bit count. To remedy this problem, the present disclosure introduces a TDM arbiter that is modified to employ a concept of "profiles" whereby various clients having common attributes (e.g., common communication speeds or priorities) are commonly grouped. Each group of clients is then periodically presented to a common list, and a strict arbitration process is performed on the clients on the list to determine which client should have access to a shared resource. This approach both avoids those problems associated with conventional TDM schemes, as well as the downfalls of other forms of arbitration, such as round-robin and modified round-robin schemes.

Figure 1:
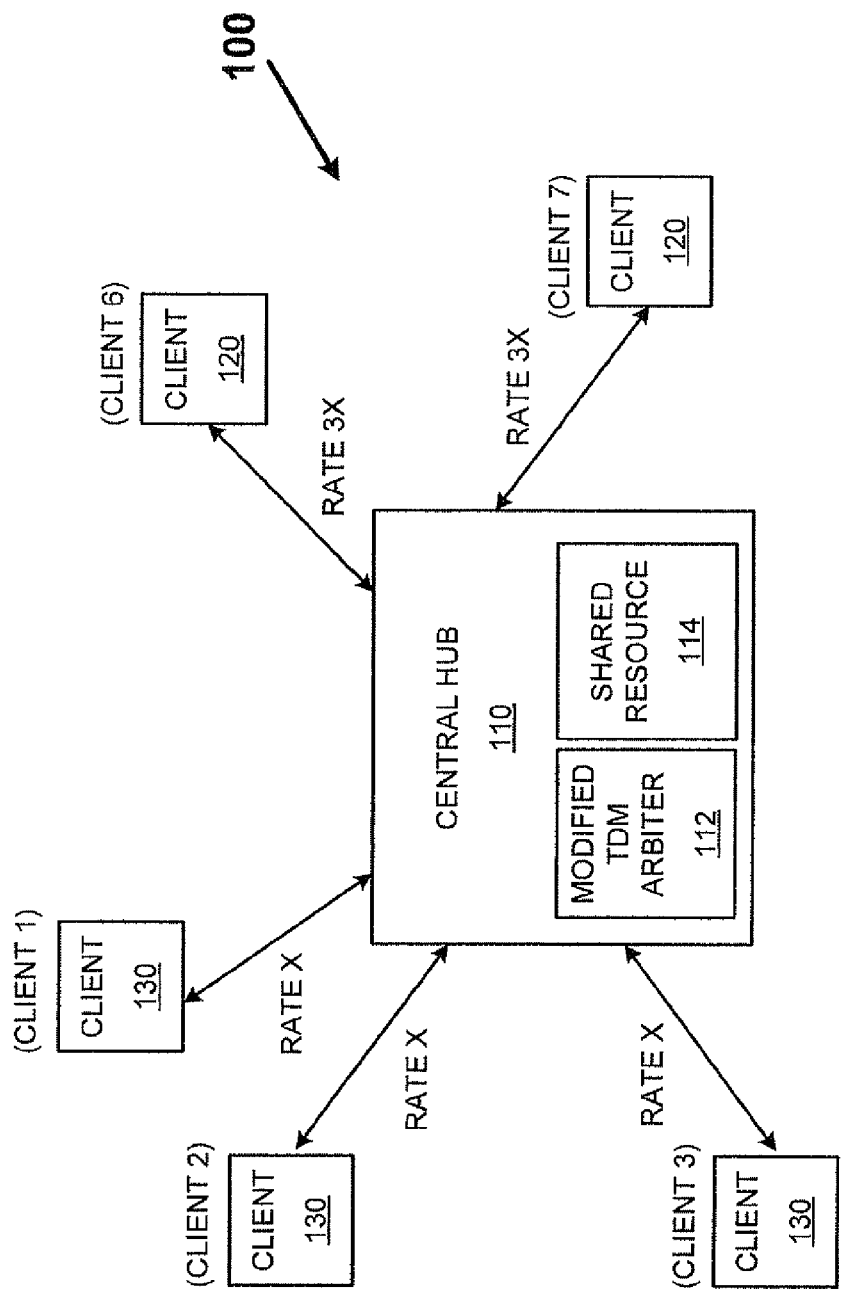
FIG. 1 depicts an example of an arbitrated system.

FIG. 1 depicts an example of an arbitrated system 100 according to an embodiment of the disclosure. The example arbitrated system 100 includes a central hub 110 with two "fast" clients 120 communicating with the central hub 110 at a rate of 3X bits/s and three "slow" clients 130 communicating with the central hub at a rate of X bits/s. The central hub 110 includes a modified TDM arbiter 112 and a shared resource 114.

In various embodiments, the central hub 110 employs any number of known or later developed devices or systems for which arbitration might be appropriate. For example, in certain embodiments the central hub 110 is a computer-based router allowing various automated cameras to download video data to the shared resource 114. In such embodiments, the shared resource 114 takes any of a wide variety of devices, such as a computer-based server, a memory, a communication port to another device, a network switch fabric, a specialized state machine, a complex computational element, and so on. The fast clients 120 and slow clients 130 are any number of devices that might have some need to communicate with the shared resource 114, such as personal computers, specialized processing devices, sensor systems, video displays, and so on. For ease of explanation, the example arbitrated system 100 is limited to five total clients (1, 2, 3, 6, 7) having two different communication speeds (3X, X). However, it is noted that the number of clients and their respective communication speeds can vary from embodiment to embodiment as may be found useful or otherwise desirable.

The modified TDM arbiter 112 is a modified Time Division Multiplexing (TDM) arbitration system designed to overcome some of the known problems with conventional TDM arbitration systems, which do not work well with large numbers of clients or with clients having large disparities in communication speeds. The modified TDM arbiter 112 has another benefit in that it is (optionally) self-configuring. That is, the modified TDM arbiter 112 automatically configures itself based upon the various speeds of clients accessing the shared resource 114 as will be explained below.

Figure 2:
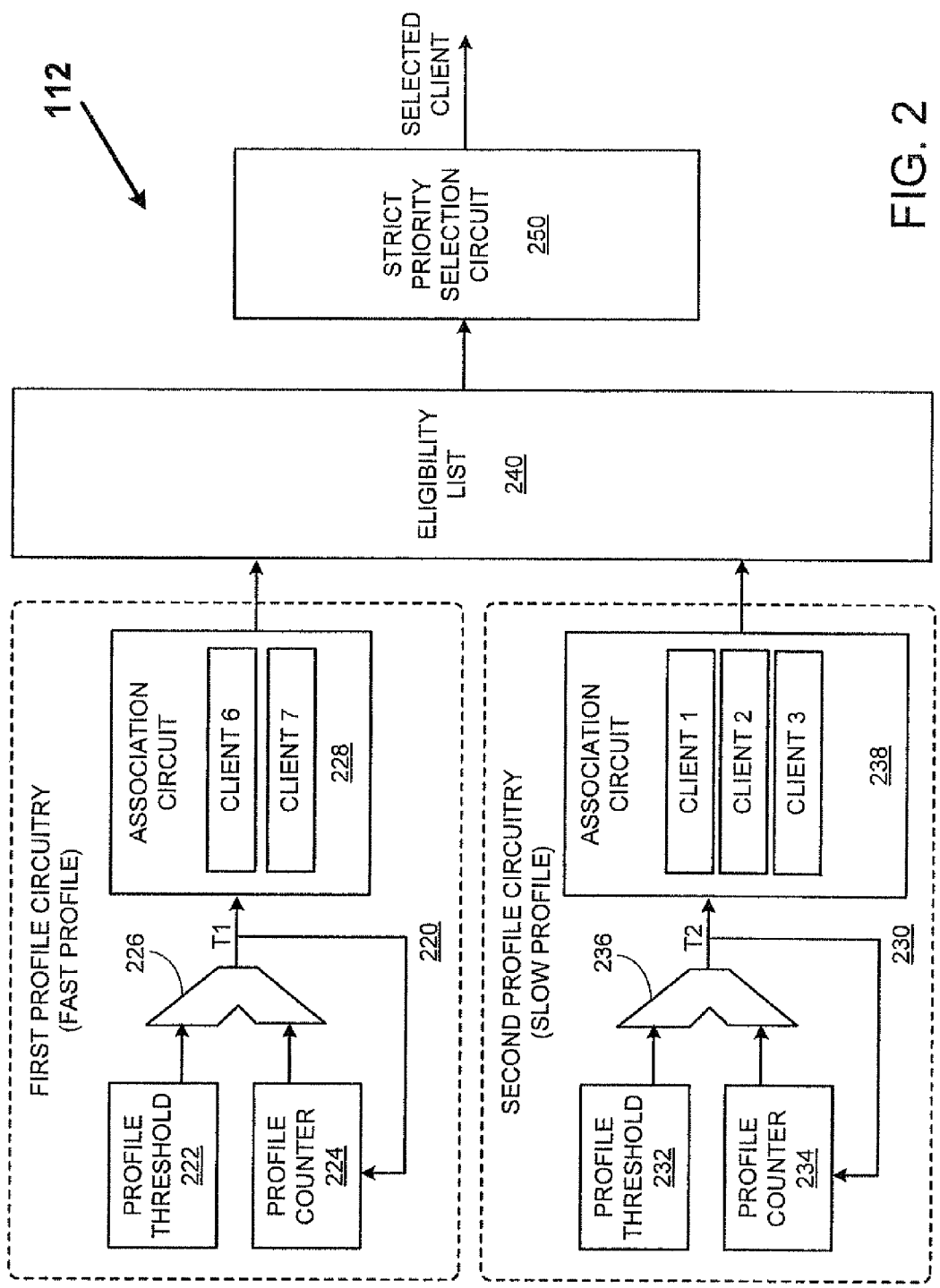
FIG. 2 depicts details of the example arbiter of FIG. 1.

FIG. 2 depicts details of the modified TDM arbiter 112 of FIG. 1. The modified TDM arbiter 112 includes a set of first profile circuitry 220, a set of second profile circuitry 230, an eligibility list 240, and a strict priority selection circuit 250. In accordance with an embodiment, the first profile circuitry 220 includes a first profile threshold circuit 222, a first profile counter circuit 224, a first comparator circuit 226 and a first profile association circuit 228. Similarly, the second profile circuitry 230 includes a second profile threshold circuit 232, a second profile counter circuit 234, a second comparator circuit 236 and a second profile association circuit 238.

According to some embodiments, the various components 220-250 are composed entirely of dedicated digital circuitry. In other embodiments, the various components 220-250 are constructed from software/firmware residing in a computer-readable memory and executed by a processing system containing an appropriately constructed arithmetic logic unit. In yet embodiments, the various components 220-250 are a hybrid combination of both dedicated hardware and software/firmware. However, it is noted that the makeup of the various components 220-250 can take a wide variety of forms in view of developments electronic circuitry, optical circuitry, quantum circuitry, and/or other technologies.

In operation, a user, such as a network engineer, accesses/modifies the first profile association circuit 228 to associate any number of clients with the "fast profile" (3X bits/second) and accesses/modifies the second profile association circuit 238 to associate any number of clients with the "slow profile" (1X bits/second). In the present example, the first profile association circuit 228 contains some form of identification (ID) to associate two fast clients (6, 7), such as the fast clients 120 of FIG. 1, with the first profile circuitry 220. Similarly, the second profile association circuit 238 contains some form of ID to associate three clients (1, 2, 3), such as the slow clients 130 of FIG. 1, with the second profile circuitry 230. The example of FIG. 2 is limited to two profiles and five total clients for the sake of simplified explanation. However, in practice the number of potential profiles and potential clients can vary greatly from embodiment to embodiment.

In certain embodiments, it is useful to associate clients with particular profiles based upon the data transfer speed of the individual clients with a shared resource. For example, assuming clients (1, 2, 3) all use a 100 Mbit/s interface and have identical importance to one another, and clients (6, 7) both use a 300 Mbit/s interface and have identical importance to one another, it can be useful to associate clients (6, 7) with the fast profile circuit 220 and clients (1, 2, 3) with the slow profile circuit 230. Such association of clients to profiles may be done manually, or may be done automatically. For example, in an embodiment, the modified TDM arbiter 112 includes sensing circuitry (not shown) that automatically detects the speed of each client (1, 2, 3) and (6, 7), then groups each client to a profile according to the sensed speeds.

Once clients are assigned to profiles, a first periodic trigger signal T1 is generated by trigger circuitry, which is composed of the first counter circuit 224, the first threshold circuit 222 and the first comparator circuit 226. Similarly, a second periodic trigger signal T2 is generated by trigger circuitry composed of the second counter circuit 234, the second threshold circuit 232 and the second comparator circuit 236.

The example trigger signals T1 and T2 are periodically generated at a rate that is a function of the data transfer speed of a profile's clients with the shared resource. For instance, the periodicity of the example trigger signals T1 and T2 can be generated to reflect the relative data transfer speeds between the clients 120 and 130 and the shared resource 114 of FIG. 1, which for the present example is a factor of three. Also, the periodicity of the example trigger signals T1 and T2 can be generated to reflect the number of clients in each profile. For instance, by use of relative speeds and the number of each client in each profile a "total weight" calculation W may be made to determine TDM frame size, i.e., a TDM frame can be calculated to have a size based on a sum of products of relative data transfer speeds and number of clients for each profile. That is, W=sum [(relative client speed)× (clients)].

Using the relative speeds and clients for the example of FIG. 2, W=(1X)(3 clients)+(3X)(2 clients)=3+6=9. Ergo, the TDM frame size is determined to be 9 slices. The trigger rate for T1 is then calculated as W/3X=3, and trigger rate for T2 is then calculated as W/1X=9. Accordingly, a value of "3" is placed in the first profile threshold circuit 222, and a value of "9" is placed in the second profile threshold circuit 232. While threshold values are often integer multiples of one another due the nature of communication standards that are often promulgated, e.g., 10 baseT and 100 baseT Ethernet, there may be arbitration situations where integer multiples of trigger periods are not required or appropriate.

As the modified TDM arbiter 112 commences to produce TDM frames and slices, the counter circuits 224 and 234 increment upon the passing of each TDM slice. With each increment (or decrement), the outputs of the counter circuits 224 and 234 are compared to the outputs of the respective profile threshold circuits 222 and 232 by the respective comparator circuits 226 and 236. If there is a match, a trigger signal T1 and/or T2 is generated. Each trigger signal T1 and/or T2 is then used to reset their respective counter circuits 224 and 234, and as a result the respective comparators 226 and 236 periodically generate respective trigger signals T1 and T2 concurrent with slices of TDM frames and at rates that differ from one another.

Upon the generation of a trigger signal T1 and/or T2, each client associated with the respective trigger signal T1 and/or T2 (i.e., the clients identified in the respective profile association circuit 236 and 238) is effectively placed in the eligibility list 240. In the present example, since trigger signal T1 is generated/activated every third TDM slice, clients (6, 7) are each effectively placed in the eligibility list 240 every third TDM slice. Since trigger signal T2 is generated/activated for every ninth TDM slice, clients (1, 2, 3) are each effectively placed in the eligibility list 240 every ninth TDM slice.

For each slice, those clients listed in the eligibility list 240 are presented to the strict priority selection circuit 250, which performs a strict priority selection process or (optionally) some other arbitration scheme usable to select a client to be given access to a shared resource. In an embodiment, the strict priority selection circuit 250 selects a client from the eligibility list 240 according to the client attributes in the profiles, such as priority, speed, and the like. In an example, when the eligibility list 240 includes (7, 2, 3), the strict priority selection circuit 250 selects client 7 for accessing the shared resource in a first TDM slice. Then, the eligibility list 240 includes (2, 3), and the strict priority selection circuit 250 selects client 2 for accessing the shared resource in a second TDM slice. Further, in the example, a T1 trigger is generated at this time, then the eligibility list 240 includes (6, 7, 3), and the strict priority selection circuit 250 selects client 6 for accessing the shared resource in a third TDM slice.

Figure 3:
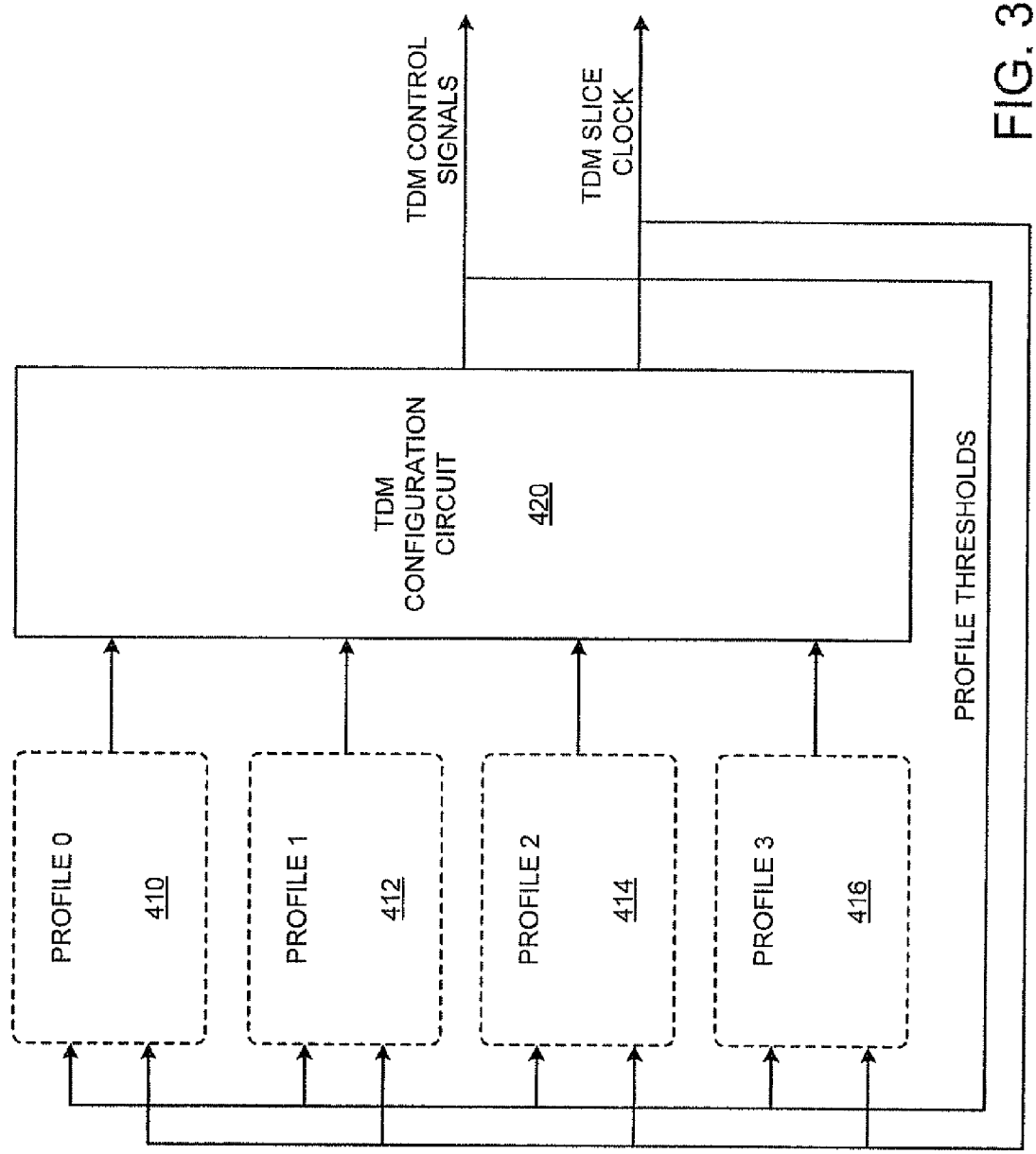
FIG. 3 depicts further details of the example arbiter of FIG. 1.

FIG. 3 depicts further details of the modified TDM arbiter 112 of FIG. 1. As mentioned above, it may be useful to employ an arbiter that is able to self-configure, i.e., configure without the aid of a human technician. In the example of FIG. 3, four example profiles 410, 412, 414 and 416 are established with each profile representing one or more clients having a particular data communication speed. For example, the first profile 410 represents 10 Mbit/s clients, the second profile 412 represents 100 Mbit/s clients, the third profile 414 represents 1 Gbit/s clients, and the fourth profile 416 represents 10 Gbit/s clients.

After each of the profiles 410-416 are established and have one or more associated clients, the respective data communication speed information of the clients/profiles 410-416 is fed to the TDM configuration circuitry 420. In turn, TDM configuration circuitry 420 determines the configuration of TDM frames and slices. For example, in an embodiment, the TDM configuration circuitry 420 determines how many slices are in a TDM frame (e.g., total weight W), how many TDM frames are in a super-frame (if applicable), and so on. Further, in certain embodiments the TDM configuration circuitry 420 establishes threshold values for the various profiles 410-416 to generate periodic trigger signals, as well as produces a clock signal synchronized with each progressive slice. For example, if only the first profile 410 were established by association with two same-speed clients, then the TDM configuration circuitry 420 can ignore profiles 412, 414 and 416, configure a frame have two slices, and place a threshold value of "1" in the first profile 410. However, if all four profiles 410, 412, 414 and 416 are established with their own sets of clients, then the TDM configuration circuitry 420 configures a different slice/frame ratio, and places different threshold values (with establish different trigger rates) in the four profiles 410, 412, 414 and 416.

Figure 4:
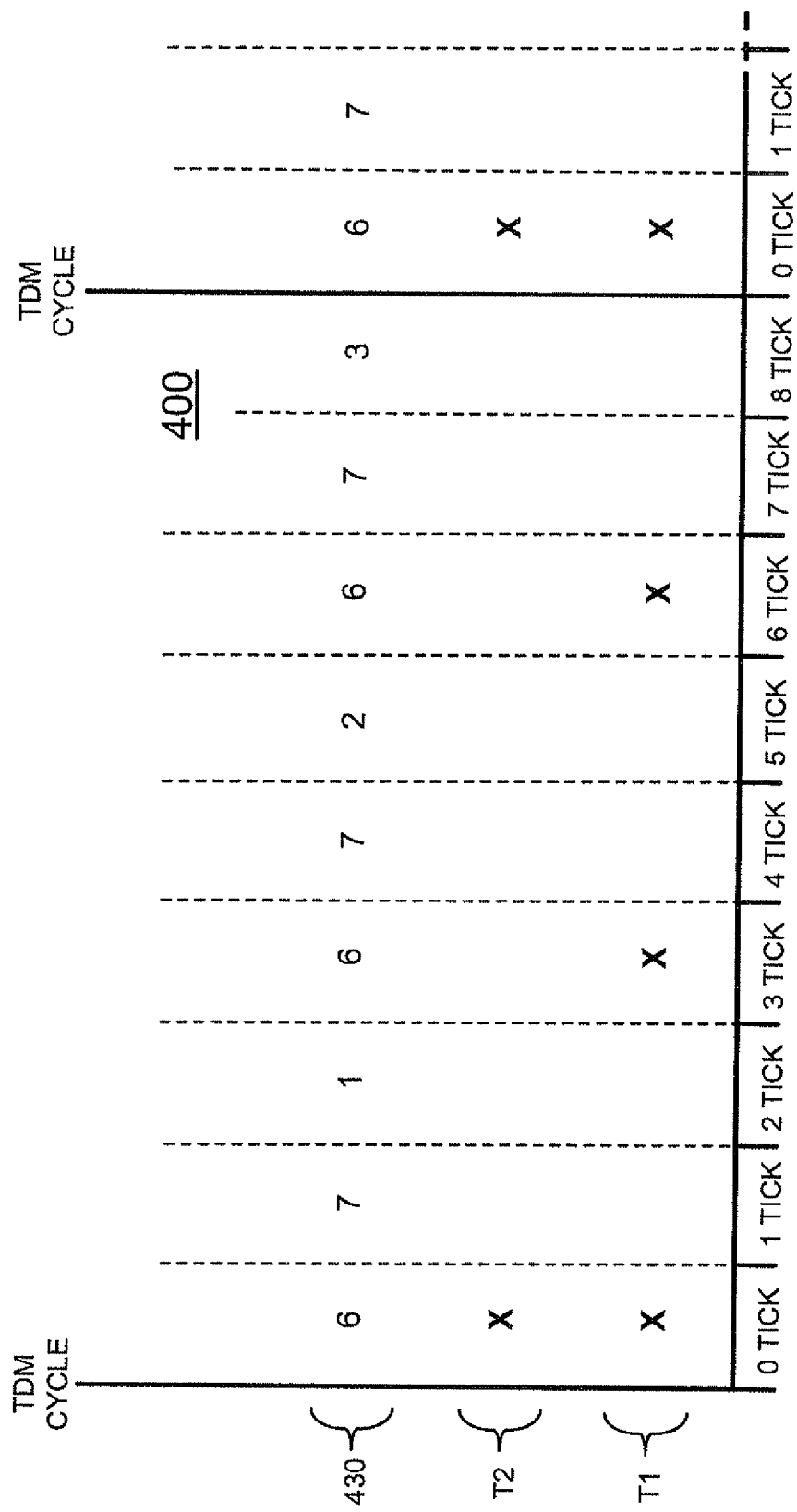
FIG. 4 depicts an example arbitration timeline.

FIG. 4 depicts an example arbitration timeline 400 for the modified TDM arbiter 112 of FIGS. 1-3. As shown in FIG. 4, TDM frames of 9 milliseconds are established based on the "total weight" (W =9) calculation performed above, and trigger signal T1 is set at 3 (W/3X) while trigger signal T2 is set at 9 (W/1X). Accordingly, clients (6, 7) are presented to the eligibility list 240 of FIG. 2 every 3 slices/ticks, while clients (1, 2, 3) are presented to the eligibility list 240 every 9 slices/ticks. Using the strict priority selection circuit 250 of FIG. 2, a stream 430 of selected clients {6, 7, 1, 6, 7, 2, 6, 7, 3, 6, 7 . . . } is output to determine access of the selected clients to a shared resource.

Figure 5:
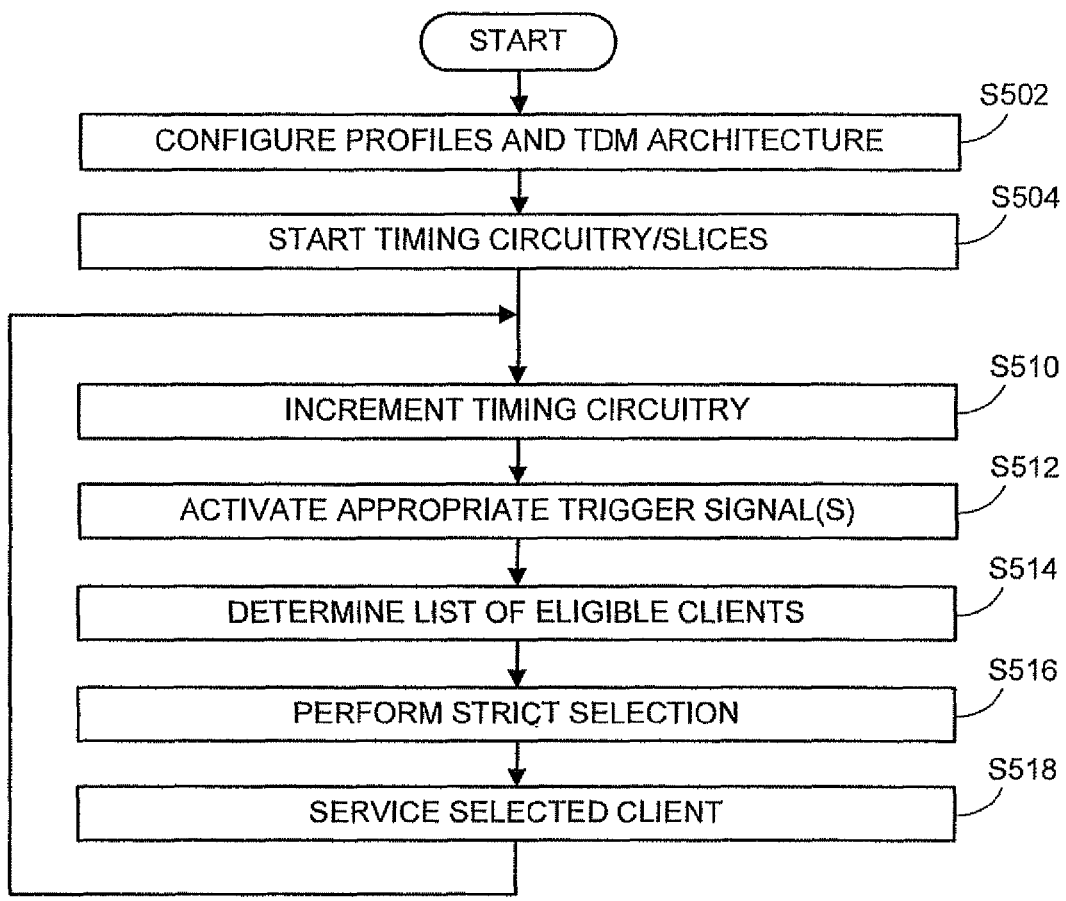
FIG. 5 is a flowchart outlining an example operation of the disclosed methods and systems for arbitration of clients for a shared resource.

FIG. 5 is a flowchart outlining an example operation of the disclosed methods and systems for arbitration of clients for a shared resource. While the below-described steps are described as occurring in a particular sequence for convenience, it is noted that the order of various steps may be changed from embodiment to embodiment. It is further noted that various steps may occur simultaneously or be made to occur in an overlapping fashion.

The process starts in step S502 where a number of profiles are configured by associating each available client with an appropriate profile, which in turn leads to the configuration of TDM frames, threshold values, trigger rates, and so on. By way of example, a first set of clients (1, 2, 3) is assigned to a first profile that requires only intermittent servicing while a second set of clients (6, 7) is assigned to a second profile requiring servicing at a rate greater than that of the first profile. Next, in step S504, the appropriate timing circuitry is started to initiate TDM slices. Control continues to step S510.

In step S510, timing circuitry for each profile is incremented for each passing slice. For instance, using the example timing circuitry of FIG. 2, profile counters (224, 234) are incremented, Next, in step S512 the appropriate trigger signals are generated/activated concurrent with each TDM slice using the counters (224, 234), threshold (222, 232) and comparator (226, 236) circuitry. Then, in step S514 each client associated with a profile of an activated trigger signal is effectively placed on a list of eligible clients. Control continues to step S516.

In step S516, a second arbitration scheme, such as the strict arbitration process discussed above, is applied to the list of eligible clients to produce a selected client to be given access to a shared resource for the impending slice. Next, in step S518 the selected client of step S516 is given access to the shared resource. Control then returns to step S510 so as to repeat steps S510-S518 as needed or otherwise desirable.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An arbitration system for scheduling access of a plurality of clients to a shared resource, comprising:
   a plurality of association circuits corresponding to a plurality of profiles, each association circuit configured to associate clients with the corresponding profile based on client attributes;
   a plurality of trigger circuits respectively coupled to the plurality of association circuits, wherein each trigger circuit is configured to periodically generate trigger signals at a rate based on the corresponding profile of the coupled association circuit, and each trigger signal causes the associated clients of the corresponding profile to be placed on a list of eligible clients; and
   selection circuitry configured to select, for a time slice in a Time Division Multiplexing (TDM) frame, a client from the list of eligible clients using an arbitration scheme to access the shared resource.

2. The arbitration system of claim 1, wherein the selection circuitry is configured to select the client from the list of eligible clients using a strict arbitration scheme.

3. The arbitration system of claim 1, wherein each of the plurality of trigger circuits increments or decrements using a clock synchronized with Time Division Multiplexing (TDM) slices.

4. The arbitration system of claim 3, wherein at least one trigger circuit produces trigger signals at a multiple integer rate of a second trigger circuit.

5. The arbitration system of claim 1, wherein each association circuit is configured to associate clients with profiles based upon a data transfer speed of individual clients with the shared resource.

6. The arbitration system of claim 5, wherein each trigger circuit periodically generates trigger signals at a rate that is a function of the data transfer speed of the clients of respective association circuits.

7. The arbitration system of claim 1, wherein the TDM frame is determined based on a sum of products of relative data transfer speeds and number of clients for each profile.

8. The arbitration system of claim 1, further comprising a configuration circuitry configured to determine the rate for each of the trigger circuits based on the client attributes of the plurality of clients.

9. The arbitration system of claim 8, wherein the configuration circuitry is configured to determine the TDM frame based upon a sum of products of relative data transfer speeds and number of clients for each profile.

10. A method for scheduling access of a plurality of clients to a shared resource, the method comprising:
    associating the plurality of clients with one or more profiles based on client attributes;
    for each profile, periodically generating triggers at a rate based on the profile to cause clients associated with the profile to be placed on a list of eligible clients in response to each trigger; and
    selecting, for a time slice in a Time Division Multiplexing (TDM) frame, one client from the list of eligible clients using arbitration scheme to access the shared resource.

11. The method of claim 10, wherein selecting the client from the list of eligible clients using arbitration scheme further comprises selecting the client based on a strict arbitration scheme.

12. The method of claim 10, further comprising calculating a TDM frame size as a sum of products of relative data transfer speeds and number of clients for each profile.

13. The method of claim 10, wherein associating the plurality of clients with the profiles based on the client attributes further comprises associating the plurality of clients with the profiles based upon the data transfer speed of individual clients with the shared resource.

14. The method of claim 13, further comprising periodically generating trigger signals at a rate that is a function of the data transfer speed of the profile's clients with the shared resource.

15. The method of claim 10, further comprising configuring the TDM frame based upon the presence of at least one client associated with at least one profile of a plurality of available profiles.

16. A system, comprising:
    a resource configured to be shared by a plurality of clients;
    a plurality of association circuits corresponding to a plurality of profiles, each association circuit configured to associate clients in the plurality of clients with the corresponding profile based on client attributes;
    a plurality of trigger circuits respectively coupled to the plurality of association circuits, wherein each trigger circuit is configured to periodically generate triggers at a rate based on the corresponding profile of the coupled association circuit to cause the associated clients of the corresponding profile to be placed on a list of eligible clients; and
    selection circuitry configured to select, for a time slice in a Time Division Multiplexing (TDM) frame, a client from the list of eligible clients using an arbitration scheme to access the resource.

17. The system of claim 16, wherein the selection circuitry is configured to select the client from the list of eligible clients using a strict arbitration scheme.

18. The system of claim 16, wherein each association circuit is configured to associate clients with profiles based upon a data transfer speed of individual clients with the resource.

19. The system of claim 18, wherein each trigger circuit periodically generates trigger signals at a rate that is a function of the data transfer speed of the clients of respective association circuits.

20. The system of claim 18, wherein a number of time slices in the TDM frame is determined based on a sum of products of relative data transfer speeds and number of clients for each profile.

* * * * *